US009401002B2

(12) United States Patent
Autrusseau

(10) Patent No.: US 9,401,002 B2
(45) Date of Patent: Jul. 26, 2016

(54) METHOD FOR INSERTING, IN THE FOURIER DOMAIN, A DIGITAL WATERMARK IN AN IMAGE AND CORRESPONDING METHOD FOR DETECTING A DIGITAL WATERMARK IN AN IMAGE TO BE ANALYZED

(71) Applicants: Centre National De La Recherche Scientifique—CNRS, Paris (FR); Universite De Nantes, Nantes (FR)

(72) Inventor: Florent Autrusseau, Nantes (FR)

(73) Assignees: CENTRE NATIONAL DE LA RECHERCHE SCIENTIFIQUE—CNRS, Paris (FR); UNIVERSITE DE NANTES, Nantes (FR)

( * ) Notice: Subject to any disclaimer, the term of this patent is extended or adjusted under 35 U.S.C. 154(b) by 0 days.

(21) Appl. No.: 14/378,502

(22) PCT Filed: Feb. 12, 2013

(86) PCT No.: PCT/EP2013/052787
§ 371 (c)(1),
(2) Date: Aug. 13, 2014

(87) PCT Pub. No.: WO2013/120850
PCT Pub. Date: Aug. 22, 2013

(65) Prior Publication Data
US 2015/0125026 A1 May 7, 2015

(30) Foreign Application Priority Data
Feb. 13, 2012 (FR) .................................. 12 51325

(51) Int. Cl.
*G06K 9/00* (2006.01)
*G06T 1/00* (2006.01)
*H04N 1/32* (2006.01)

(52) U.S. Cl.
CPC ............ *G06T 1/0064* (2013.01); *H04N 1/3216* (2013.01); *H04N 1/3232* (2013.01);

(Continued)

(58) Field of Classification Search
None
See application file for complete search history.

(56) References Cited

U.S. PATENT DOCUMENTS

| 8,243,980 | B2 * | 8/2012 | Rhoads | ............. G06K 9/00442 382/100 |
| 2008/0273744 | A1 * | 11/2008 | Kogure | ................. G06T 1/0065 382/100 |
| 2015/0125026 | A1 * | 5/2015 | Autrusseau | ........... G06T 1/0064 382/100 |

FOREIGN PATENT DOCUMENTS

| EP | 1215908 A2 | 6/2002 |
| WO | 0130064 A1 | 4/2001 |

OTHER PUBLICATIONS

French Search Report and Written Opinion dated Aug. 22, 2012 for corresponding French Application No. 1251325, filed Feb. 13, 2012.
(Continued)

*Primary Examiner* — Tahmina Ansari
(74) *Attorney, Agent, or Firm* — David D. Brush; Westman Champlin & Koehler, P.A.

(57) ABSTRACT

A method is provided for inserting a digital watermark in an image by an insertion device. Inserting includes: applying a Fourier transform to the image, delivering a 2D Fourier spectrum; inserting the watermark in the Fourier spectrum delivering a modified Fourier spectrum; and applying an inverse Fourier transform to the modified Fourier spectrum delivering a watermarked image. The watermark includes a set of watermarking coefficients each associated with a distinct determined position of a given quadrant among the quadrants of the Fourier domain, the spectral coordinates u and v of which, measured along the two axes of coordinates of the given quadrant and starting from the continuous component and expressed in percentage of the dimensions U and V of the given quadrant, are such that: $u > 66\% \times U$ and $v > 66\% \times V$. The set of positions associated with the watermarking coefficients defines a convex pattern in the given quadrant.

23 Claims, 8 Drawing Sheets

(52) U.S. Cl.
CPC ....... *H04N1/32197* (2013.01); *H04N 1/32352* (2013.01); *G06T 2201/0052* (2013.01); *G06T 2201/0064* (2013.01); *G06T 2201/0601* (2013.01)

(56) References Cited

OTHER PUBLICATIONS

Bhatnagar et al., "Robust Watermarking Scheme Based on Multiresolution Fractional Fourier Transform", Computer Vision, Graphics & Image Processing, 2008. ICVGIP '08. Sixth Indian Conference On, IEEE, Piscataway, NJ, USA, Dec. 16, 2008, pp. 1-8, XP031409423.

Koch et al., "Towards Robust and Hidden Image Copyright Labeling", Proceedings of IEEE Workshop on Nonlinear Signal and Image Processing, Jun. 1, 1995, pp. 1-4, XP002923279.

Cox et al., "Secure Spread Spectrum Watermarking for Multimedia", IEEE Transactions on Image Processing, IEEE Service Center, Piscataway, NJ, USA, vol. 6, No. 12, Dec. 1, 1997, XP011026243.

Solachidis et al., "Circularly Symmetric Watermark Embedding in 2-D DFT Domain", Draft, Department of Informatics, University of Thessaloniki.

English translation of Written Opinion dated Aug. 13, 2014 for corresponding International Patent Application No. PCT/EP2013/052787, filed Feb. 12, 2013.

* cited by examiner

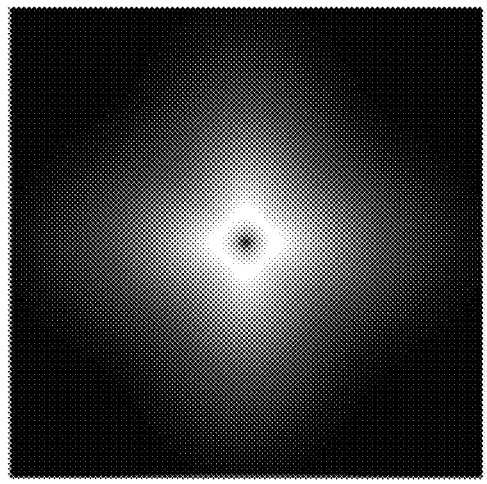
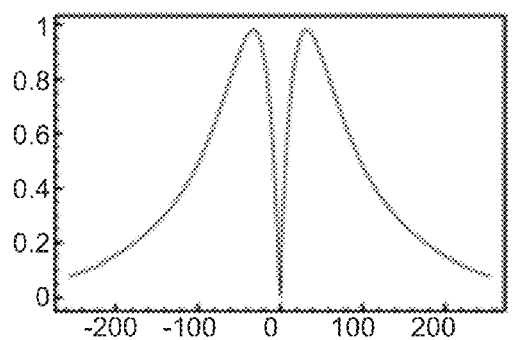
(a) CSF-2D  (b) CSF-1D
Fig. 7A  Fig. 7B
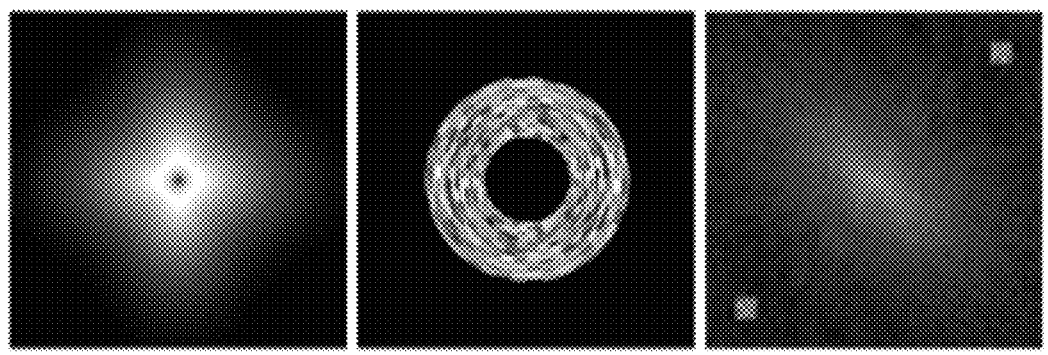
Fig. 8

METHOD FOR INSERTING, IN THE FOURIER DOMAIN, A DIGITAL WATERMARK IN AN IMAGE AND CORRESPONDING METHOD FOR DETECTING A DIGITAL WATERMARK IN AN IMAGE TO BE ANALYZED

1. CROSS-REFERENCE TO RELATED APPLICATIONS

This application is a Section 371 National Stage Application of International Application No. PCT/EP2013/052787, filed Feb. 12, 2013, the content of which is incorporated herein by reference in its entirety, and published as WO 2013/120850 on Aug. 22, 2013, not in English.

2. FIELD OF THE INVENTION

The field of the invention is that of digital watermarking of images. This is a technique by which copyright information or other verification messages are added to an image. The message included in the host image, generally called a mark or watermark, is a set of bits, the content of which depends on the application. The watermark is, for example, the name or an identifier of the creator, the owner, the buyer or again a form of signature describing the host signal.

More specifically, the invention pertains to a technique for inserting a digital watermark into an image, as well as to the corresponding technique for detecting a digital watermark in an image to be analyzed The invention has numerous applications, such as for example the insertion and the detection of a watermark in a color or gray-scale still image (especially but not exclusively in one of the following input formats: bmp, jpg, tif, gif, png . . . ). The images are for example text type images (signatures especially). However, natural images can also be used.

3. TECHNOLOGICAL BACKGROUND

Robustness relative to geometrical distortions is one of the greatest challenges in the watermarking of images and videos.

The attack known as the "print & scan" attack is one of the most devastating attacks known.

In one set of problems related to copyright protection for authors, when an image is watermarked, a watermark presenting copyright information is inserted into the image. This image, thus protected, risks being subjected to modifications (intentional or unintentional). These modifications are called attacks on the watermarked document. Any attack can lead to a partial erasure of the watermark. The more virulent the attack, the greater is the deterioration of the quality of the watermarked image and the greater are the chances that the detector will lose the watermark. There is therefore a need to propose a technique for watermarking images (including text-type images) that is robust against "print & scan" attacks).

Printing and scanning a document (an image) leads to a multitude of attacks:
Adding noise, due to the scanner and the printer;
<<Scaling>> due to the scanner and the printer;
<<Shearing>> due to the scanner and the printer;
conversion of color to gray scale, due to the scanner and the printer;
conversion of depth (for example from 255 bpp to 2, 8, 16 . . . bpp), due to the scanner and the printer;
analog-to-digital conversion;
rotation, due to the scanner and the printer;
shifting due to the scanner and the printer;
change of image format (tif/pdf/jpg/ . . . ), due to the scanner;
cropping due to the scanner;
compression, typically JPG or J2K, due to the scanner;
Etc.

First of all, one of the pioneering articles on the use of multiplicative watermarking (and its comparison with additive watermarking) was presented in the following article: I. J. Cox, J. Kilian, T. Leighton, and T. Shamoon. Secure spread spectrum watermarking for multimedia. *IEEE Transactions on Image Processing*, 6(12):1673-1687, 1997.

The authors of this article present chiefly three watermark insertion equations:

$$v'_i = v_i + \alpha x_i$$

$$v'_i = v_i(1+\alpha)x_i$$

$$v'_i = v_i(e^{\alpha x_i})$$

Here $v'_i$ is a watermarked image (or an image coefficient, $v_i$ is the original image (or an image coefficient), $x_i$ is a watermark (or a watermark coefficient) inserted into the image (or the image coefficient), and $\alpha$ is a weighting factor (often a simple numerical value, sometimes dependent on the image: the term used then is watermark weighting coefficient). The greater the strength of the watermark $\alpha$ the greater is the risk that the watermarked image will be degraded, and the greater the robustness of the watermark.

The measurement of similarity used in this article (and very often taken up in other work on watermarking) is the following:

$$sim(X, X^*) = \frac{X^* \cdot X}{\sqrt{X^* \cdot X^*}}$$

X* representing an extracted mark and X the original mark.

These studies have introduced the concept of spread-spectrum watermarking. This concept comes from the theory of communications and is expressed in watermarking by a spreading of the watermark throughout the image (or through all its transformed coefficients). This generally leads to a watermark of very low amplitude occupying all the coefficients of the image.

The following article is also known: V. Solachidis and I. Pitas. "Circularly symmetric watermark embedding in the 2D DFT domain". *IEEE Transactions on Image Processing*, 10(11):1741-1753, 2001. In this article:

the watermark is inserted additively or multiplicatively in the Fourier domain and the watermark bits are distributed on concentric circle segments forming a ring in the medium frequencies. A weighting is planned for the watermark (to increase the insertion strength "α");

the detection of the watermark uses a computation of 2D normalized cross-correlation between the potentially marked coefficients and the watermark. The detection is called <<blind>> detection as the detector needs only the watermarked image and the original watermark.

The method of correlation used by Solachidis & Pitas is the following:

$$C = \sum_{k1=1}^{N} \sum_{k2=1}^{N} W(k1, k2) M'(k1, k1)$$

where W represents the watermark and M' represents the watermarked coefficients.

This computation of correlation provides only one value (the scalar C) and this value will be used to determine whether the watermark is present in the image as a function of the detection threshold. This (scalar) value does not enable a decision to be taken optimally, as compared with the solution proposed by the invention (which provides a 2D correlation map.

Besides, the position and the shape of the watermark in the Fourier domain are two crucial aspects.

With regard to the position of the watermark, the scientific community working on watermarks has been habitually trying to modify (watermark) the mean and low frequency coefficients of the transform domains (DCT, wavelets, Fourier). The modification of the high frequency coefficients is reputed to give rise to an invisible watermark but such a modification (of the high frequencies) is supposed to offer low robustness against distortions (and especially relative to the compression algorithms). Conversely, a watermarking of the low-frequency coefficients (close to the center of the Fourier domain) is supposed to be highly robust against every type of distortion but is also very rapidly visible. To put it briefly, if a watermark is placed in the high frequencies, its strength of insertion ($\alpha$ into the equations 1 and 2) could be very great without in any way degrading the quality of the watermarked image but will offer low robustness whereas a watermark placed in the low frequencies will be far more robust but will have to be modulated by very low strength, or else it will be visible. For these reasons, and as in most watermarking methods in the literature, Solachidis and Pitas in the technique presented in their article have opted for watermarking in the medium frequencies.

With regard to the shape of the watermark, Solachidis and Pitas propose a ring-shaped watermark in the Fourier domain. One drawback is that the correlation between the original watermark and the extracted watermark (watermark to be tested) is skewed by the ring shape. In short, the correlation indicates that the two noises resemble each other but this resemblance is due to the shape of the ring. In practice, the detection threshold should be raised to take account of this skew. Indeed, if the detection threshold is not accurately set, there is a risk of obtaining false negatives or false positives (which are detection errors). It may be recalled that the detection threshold makes it possible to determine if the image is watermarked or not: if the correlation is above the threshold, the image is considered to be watermarked. If the correlation is below the threshold, the detector will declare the image to be not watermarked.

Several scenarios can be envisaged:
- a watermarked image gives rise to a correlation above the threshold: the term used here is true positive (the mark has been correctly detected);
- a watermarked image gives rise to a correlation below the threshold: the term used here is "false negative" (a watermark has been "missed");
- a non-watermarked image gives rise to a correlation below the threshold: the term used here is "true negative" (the mark has not been detected because it is not present);
- a non-watermarked image gives rise to a correlation above the threshold: the term used here is "false positive" (a mark that is not present has been detected).

3. GOALS OF THE INVENTION

The invention, in at least one embodiment, is aimed especially at overcoming these different drawbacks of the prior art.

More specifically, it is a goal of the invention, in at least one embodiment, to provide a technique for watermarking images (including text-type images) that is robust against <<print and scan>> attacks.

It is also a goal of at least one embodiment of the invention to provide a technique of this kind that is simpler to implement than the above-mentioned technique by Solachidis and Pitas.

It is another goal of at least one embodiment of the invention to provide such a technique enabling a better quality of watermarked images than with the above-mentioned technique by Solachidis and Pitas.

It is a complementary goal of at least one embodiment of the invention to provide such a technique making it possible to guarantee the invisibility (or at least the low visibility) of the watermark, while at the same time offering high robustness.

It is another goal of at least one embodiment of the invention to provide such a technique improving detection as compared the above-mentioned technique by Solachidis and Pitas.

4. SUMMARY OF THE INVENTION

In one particular embodiment of the invention, a method is provided for inserting a digital watermark in an image by means of an insertion device, the method being of the type comprising the following steps: applying a Fourier transform to said image; making it possible to obtain a two dimensional Fourier spectrum defined by Fourier coefficients at different positions of a Fourier domain comprising four quadrants each possessing two axes of coordinates extending from the continuous component; inserting said watermark in said Fourier spectrum by modification of Fourier coefficients of said Fourier spectrum, as a function of watermarking coefficients included in the watermark, making it possible to obtain a modified Fourier spectrum; applying an inverse Fourier transform to said modified Fourier spectrum making it possible to obtain a watermarked image. The watermark comprises a set of watermarking coefficients ($w_{u,v}$) each associated with a distinct determined position (u, v) of a given quadrant among said quadrants of the Fourier domain, the spectral coordinates u and v of which, measured along the two axes of coordinates of the given quadrant and starting from the continuous component and expressed in percentage of the dimensions U and V of the given quadrant, are such that: $u > 66\% \times U$ and $v > 66\% \times V$. The set of positions associated with said watermarking coefficients defines a determined convex pattern in the given quadrant.

In one particular embodiment of the invention, a method is proposed for the insertion, by an insertion device, of a digital watermark in an image, of the type comprising the following steps:
applying a Fourier transform to said image, making it possible to obtain a two dimensional Fourier spectrum defined by the Fourier coefficients at different positions of a Fourier domain, the four quadrants of which are exchanged so that the continuous component is at the center;

inserting said watermark in said Fourier spectrum by modification of Fourier coefficients of said Fourier spectrum, as a function of watermarking coefficients included in the watermark, making it possible to obtain a modified Fourier spectrum;

applying an inverse Fourier transform to said modified Fourier spectrum, making it possible to obtain a watermarked image;

said watermark comprising a set of watermarking coefficients ($w_{u,v}$) each associated with a distinct determined position (u, v) of a given quadrant among said quadrants of the Fourier domain, the spectral coordinates u and v of which, expressed in percentage of the dimensions U and V of the given quadrant, are such that: u>66%×U and v>66%×V, and the set of positions associated with said watermarking coefficients defining a determined convex pattern in the given quadrant.

The general principle of the invention therefore consists in choosing the position of the watermark, in a particular manner, in the Fourier domain (the watermark is inserted in the high frequencies and not in the medium frequencies as in the above-mentioned technique of Solachidis and Pitas) and the shape of the watermark (convex pattern and not a ring as in the above-mentioned technique of Solachidis and Pitas). This particular combination of position and shape ensures the invisibility (or low visibility) of the watermark while, at the same time, ensuring high robustness, especially against a <<print & scan>> attack.

According to one particular characteristic, the convex pattern is a square or a rectangle.

Thus, the implementation is optimized and the proposed technique of insertion is faster than that of Solachidis and Pitas. In addition, a watermark with a square shape (or rectangular shape) does not skew the detection, unlike in the case of a watermark modulated on an annular shape (as is the case in the technique of Solachidis and Pitas).

According to one particular characteristic said convex pattern is a square with $2^n \times 2^n$ positions, n being an integer greater than two.

Thus, the implementation is further optimized.

According to one particular characteristic, $3 \leq n \leq 6$.

Thus, the implementation is further optimized.

According to one particular characteristic, said watermark is inserted in complying with the central symmetry of the Fourier spectrum: for each Fourier coefficient that is situated in the given quadrant and undergoes a modification as a function of the given watermark, a Fourier coefficient that is situated in the quadrant symmetrical to the given quadrant, relative to the center of the Fourier domain, also undergoes a modification as a function of said given watermarking coefficient.

This makes it possible to rebuild a real image during the inverse Fourier transformation.

According to one particular characteristic, said convex pattern is centered on a diagonal of the given quadrant, oriented by 45° relative to the two axes of coordinates serving to define the spectral coordinates u and v of a position (u, v) in the given quadrant.

Thus, the invention takes account of the fact that the human visual system (HVS) is less sensitive to the signals having an oblique orientation (45°) in the Fourier domain.

In a first implementation of the method for detecting, the watermark is inserted according to the following insertion equation: $y_{u,v} = x_{u,v} + \alpha \times x_{u,v} \times w_{u,v}$, where:

$y_{u,v}$ is a modified Fourier coefficient, at the position (u, v) in the given quadrant of the Fourier domain;

$x_{u,v}$ is an original Fourier coefficient at the position (u, v) in the given quadrant of the Fourier domain;

α is a weighting coefficient for the watermarking strength; and $w_{u,v}$ is a watermarking coefficient taking the value +1 or −1.

This first implementation is a semi-blind watermarking: the detector needs the original image in addition to the image to be analyzed (which is potentially watermarked) and the original watermark (also called the reference watermark).

In a second implementation of the method for detecting, the watermark is inserted according to the following insertion equation: $y_{u,v} = \alpha \times x_{u,v} \times w_{u,v}$, where:

$y_{u,v}$ is a modified Fourier coefficient at the position (u, v) in the given quadrant of the Fourier domain;

$x_{u,v}$ is an original Fourier coefficient at the position (u, v) in the given quadrant of the Fourier domain;

α is a weighting coefficient of the watermarking strength; and $w_{u,v}$ is a weighting coefficient taking the value +1 or −1.

This second implementation is also a semi-blind watermarking.

In a third implementation of the method for detecting, the watermark is inserted according to the following insertion equation: $y_{u,v} = w_{u,v}$, where:

$y_{u,v}$ is a modified Fourier coefficient at the position (u, v) in the given quadrant of the Fourier domain;

$w_{u,v}$ is a watermarking coefficient included in a predetermined range.

This third implementation is a blind watermarking, and is therefore more advantageous: the detector needs only the image to be analyzed (potentially watermarked) and the original watermark (also called the reference watermark).

In addition, this third implementation improves security. Indeed, it makes the watermark less easily detectable in the Fourier domain.

According to one particular characteristic of the third implementation of the method for detecting, the minimum and maximum values of said predetermined range are a function of the values of the real parts of the Fourier coefficients each undergoing a modification as a function of said watermarking coefficients.

Thus the invention further reduces the traces of insertion of the watermark in the Fourier domain.

According to one particular characteristic, the watermark is inserted by modifying only the real part of each Fourier coefficient undergoing a modification as a function of said watermarking coefficients.

In other words, the insertion of the watermark is done only on the real part of the Fourier spectrum.

In another embodiment of the invention, a method is proposed for detecting a digital watermark in an image to be analyzed, by means of a device for detecting, the method being of the type comprising the following steps: applying a Fourier transform to the image to be analyzed making it possible to obtain a two dimensional Fourier spectrum, defined by the Fourier coefficients at different positions of a Fourier domain comprising four quadrants each possessing two axes of coordinates extending from the continuous component; measuring similarities between two Fourier spectrum portions: a reference portion and a portion to be analyzed, extracted from said Fourier spectrum of the image to be analyzed; taking a decision on presence or absence of a watermark in said portion to be analyzed as a function of the result of the step for measuring similarities. The device for detecting has at its disposal: a reference watermark comprising a set of watermarking coefficients ($w_{u,v}$) each associated with a distinct determined position (u, v) of one given quadrant among said quadrants of the Fourier domain, of which the spectral coordinates u and v, measured along both axes of coordinates of the given quadrant and starting from the continuous component, and expressed in percentage of the dimensions U and V of the given quadrant are such that: u>66%×U and v>66%×V; and the set of the positions associated with the watermarking coefficients, which define a determined convex pattern in the given quadrant of the Fourier domain. The step for measuring similarities comprises: a step for determining said reference portion, as a function of the watermarking coefficients of said reference watermark; a step for determining said portion to be analyzed (y*), consisting in obtaining the Fourier coefficients situated, in the given quadrant, at the positions associated with the watermarking coefficients of said reference watermark; a step for computing a two dimensional normalized cross-correlation between the r reference portion and the portion to be analyzed, giving a two dimensional correlation map. A decision on presence is taken if at least one value of the two dimensional correlation map is above a given threshold.

This method for detecting is complementary to the method for inserting presented here above. It uses, as a reference watermark, the watermark inserted by the method for inserting. It may be recalled that the main advantage of this watermark, which is particular in terms of position and shape in the Fourier domain, is to ensure the invisibility (or low visibility) of the watermark while at the same time offering high robustness especially against a <<print & scan>> attack.

Another advantage of the method for detecting is that it enables efficient decision-making, especially when the decision is based on a two dimensional correlation map (and not a one dimensional map as in most of the existing methods of detection).

In a first mode of implementation of the method for detecting, the step for determining said reference portion consists in taking, for a given position (u, v) in the given quadrant of the Fourier domain, the watermarking coefficient ($w_{u,v}$) associated with said given position in said reference watermark.

This first implementation of the method for detecting can be applied for example when the method for inserting is carried out according to one of the first and second modes of implementation mentioned further above.

In a second mode of implementation of the method for detecting, the step for determining said reference portion consists in taking, for a given position (u, v) in the given quadrant of the Fourier domain, the result of a weighting:
of the watermarking coefficient ($w_{u,v}$) associated with said given position,
by a reference Fourier coefficient ($x_{u,v}$) situated, in the given quadrant of the Fourier domain, at said given position, said reference Fourier coefficient belonging to a two dimensional Fourier spectrum resulting from a Fourier transform of an original image, the device for detecting having available said reference Fourier coefficient.

This second implementation of the method for detecting can be applied, for example, when the method for inserting is carried out according to the third mode of implementation mentioned further above.

According to one particular characteristic, the step for computing a two dimensional normalized cross-correlation is done according to the following equation:

$$f \star g = \mathcal{F}(F(v)G(v))$$

where:
f is the reference portion;
g is the portion to be analyzed;
$\mathcal{F}$ represents the inverse Fourier transform;
F(v) is the complex conjugate of the Fourier transform of f; and
G(v) is the Fourier transform of g.

As described in detail here below, a major difference with the method of correlation used by Solachidis & Pitas is that the cross-correlation used in the invention sends back a 2D map and not a scalar map. This makes it possible not only to evaluate a possible shifting of the correlation peak due to a geometrical distortion but also to be able to re-synchronize the image according to this shift.

According to one particular characteristic, said convex pattern is a square or a rectangle.

Thus, the implementation is optimized.

According to one particular characteristic, said convex pattern is a square with $2^n \times 2^n$ positions, n being an integer greater than two.

Thus, the implementation is further optimized.

According to one particular characteristic, $3 \leq n \leq 6$.

Thus, the implementation is optimized.

According to one particular characteristic, said convex pattern is centered on a diagonal of the given quadrant of the Fourier domain, oriented by 45° relative to the axes of coordinates serving to define the spectral coordinates u and v of a position (u, v) in the given quadrant of the Fourier domain.

Thus, the invention takes account of the fact that the human visual system (HVS) is less sensitive to signals having an oblique orientation (45°) in the Fourier domain.

Another embodiment of the invention proposes a computer program product comprising program code instructions to implement the above-mentioned method (in any one of its different embodiments), when said program is executed on a computer.

Another embodiment of the invention proposes a computer-readable non-transient medium storing a computer program comprising a set of instructions executable by a computer to implement the above-mentioned method (in any one of its different embodiments).

Another embodiment of the invention proposes a device for inserting a digital watermark in an image, of the type comprising means for applying a Fourier transform to said image; making it possible to obtain a two dimensional Fourier spectrum, defined by Fourier coefficients at different positions of a Fourier domain comprising four quadrants each possessing two axes of coordinates extending from the continuous component; means for inserting said watermark in said Fourier spectrum by modification of Fourier coefficients of said Fourier spectrum, as a function of watermarking coefficients included in the watermark, making it possible to obtain a modified Fourier spectrum; means for applying an inverse Fourier transform to said modified Fourier spectrum making it possible to obtain a watermarked image. Said watermark comprises a set of watermarking coefficients ($w_{u,v}$) each associated with a distinct determined position (u, v) of a given quadrant among said quadrants of the Fourier domain, the spectral coordinates u and v of which, measured along the two axes of coordinates of the given quadrant and starting from the continuous component and expressed in percentage of the dimensions U and V of the given quadrant, are such that: u>66%×U and v>66%×V. The set of positions associated with said watermarking coefficients defines a determined convex pattern in the given quadrant.

Another embodiment of the invention proposes a device for detecting a digital watermark in an image to be analyzed of the type comprising means for applying a Fourier transform to the image to be analyzed making it possible to obtain a two dimensional Fourier spectrum, defined by the Fourier coefficients at different positions of a Fourier domain comprising four quadrants each possessing two axes of coordinates extending from the continuous component; means for measuring similarities between two Fourier spectrum portions: a reference portion and a portion to be analyzed, extracted from said Fourier spectrum of the image to be analyzed; means for taking a decision on presence or absence of a watermark in said portion to be analyzed as a function of the result of the step for measuring similarities. The device for detecting has at its disposal: a reference watermark comprising a set of watermarking coefficients ($w_{u,v}$) each associated with a distinct determined position (u, v) of one given quadrant among said quadrants of the Fourier domain, of which the spectral coordinates u and v, measured along both axes of coordinates of the given quadrant and starting from the continuous component, and expressed in percentage of the dimensions U and V of the given quadrant are such that: u>66%×U and v>66%×V; and the set of the positions associated with the watermarking coefficients, which define a determined convex pattern in the given quadrant of the Fourier domain. The means for measuring similarities comprise: means for determining said reference portion, as a function of the watermarking coefficients of said reference watermark; means for determining said portion to be analyzed (y*), making it possible to obtain the Fourier coefficients situated, in the given quadrant, at the positions associated with the watermarking coefficients of said reference watermark; means for computing a two dimensional normalized cross-correlation between the reference portion and the portion to be analyzed, giving a two dimensional correlation map. The means for decision on presence are adapted to taking a decision on presence if at least one value of the two dimensional correlation map is above a given threshold.

Advantageously, the device for inserting and the device for detecting comprise means for implementing the steps that they perform in the method for inserting and the method for detecting, as described here above, in any one of its different embodiments.

5. LIST OF FIGURES

Other features and advantages of the invention shall appear from the following description, given by way of an indicative and non-exhaustive example and from the appended drawings, of which:

Figure 4A:
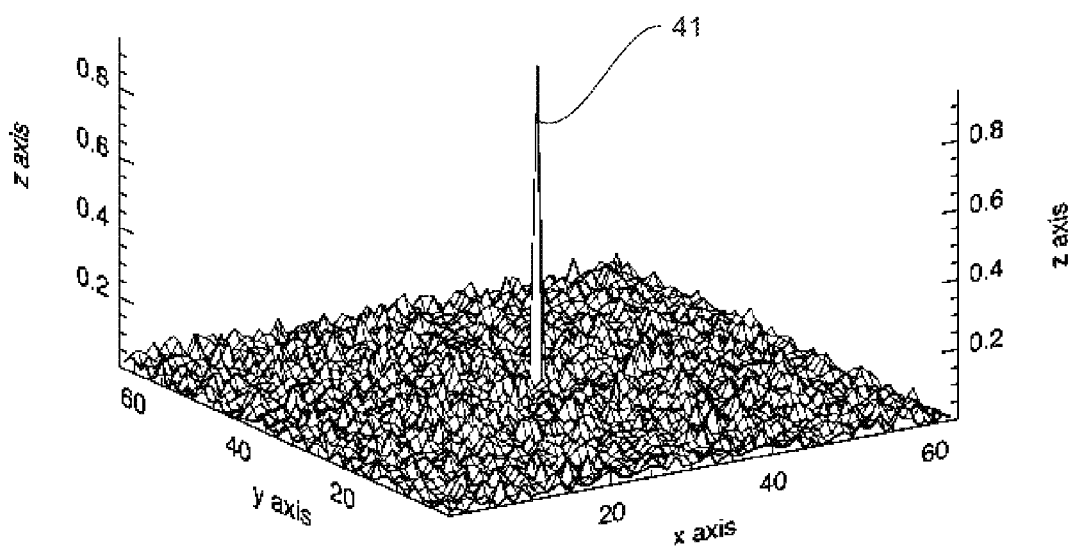
Figure 4B:
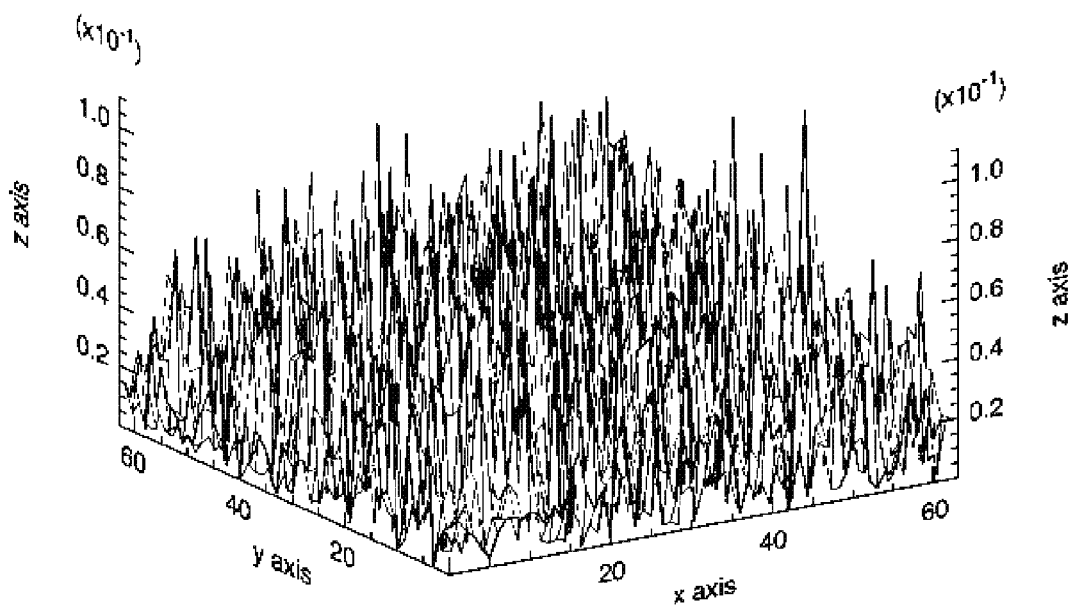
Figure 4C:
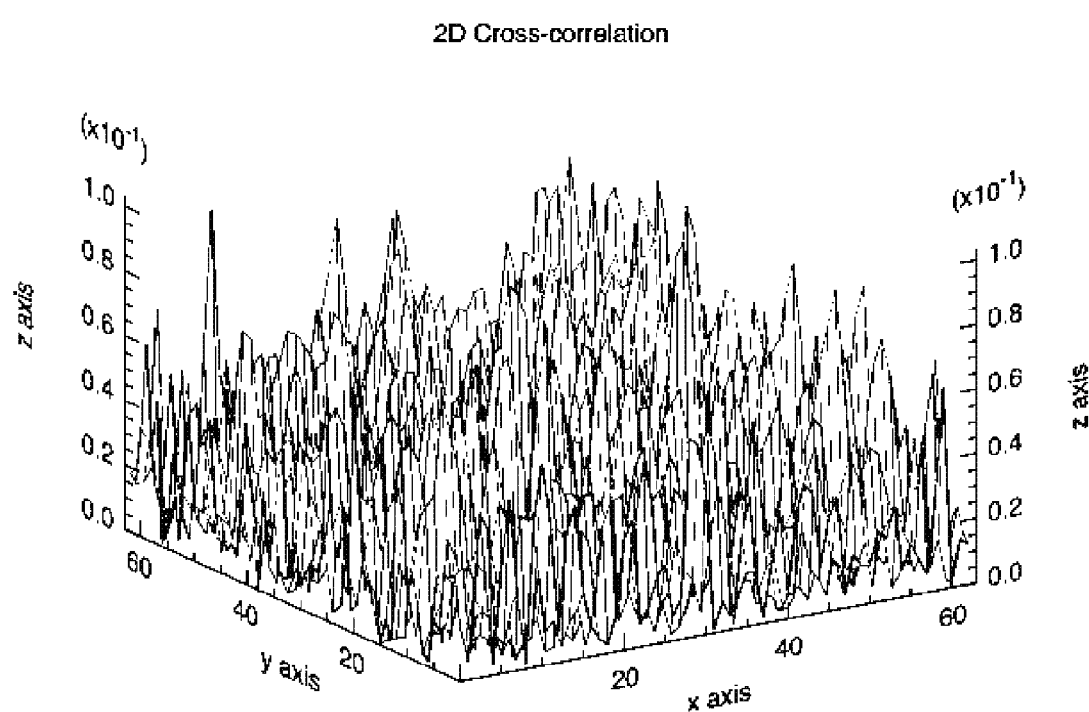
Figure 5A:
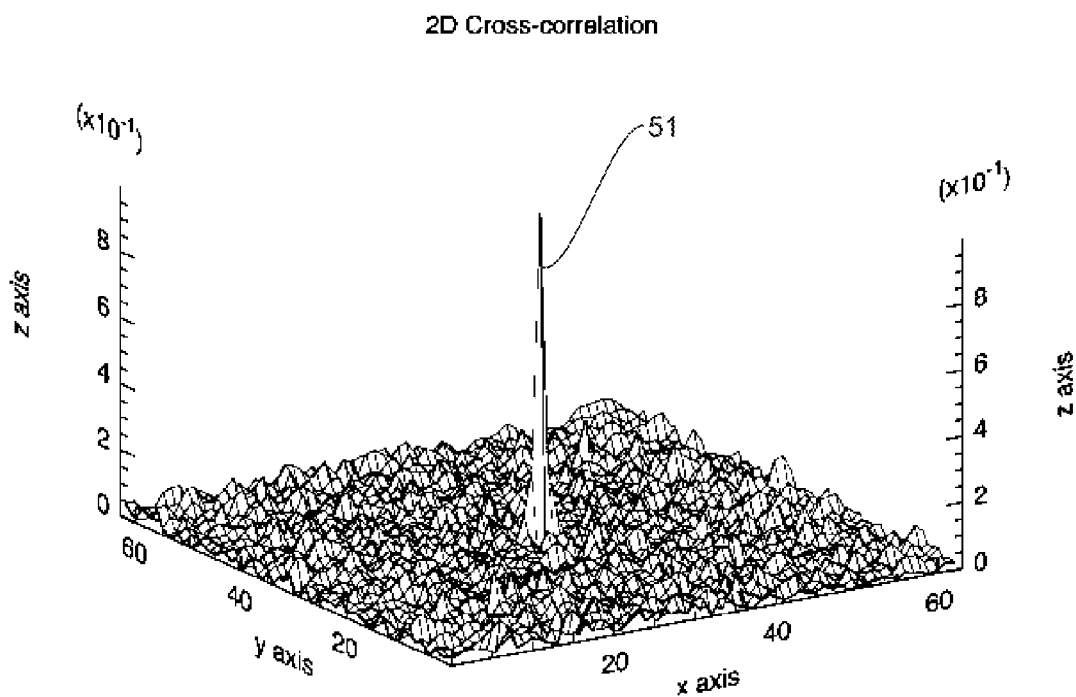
Figure 5B:
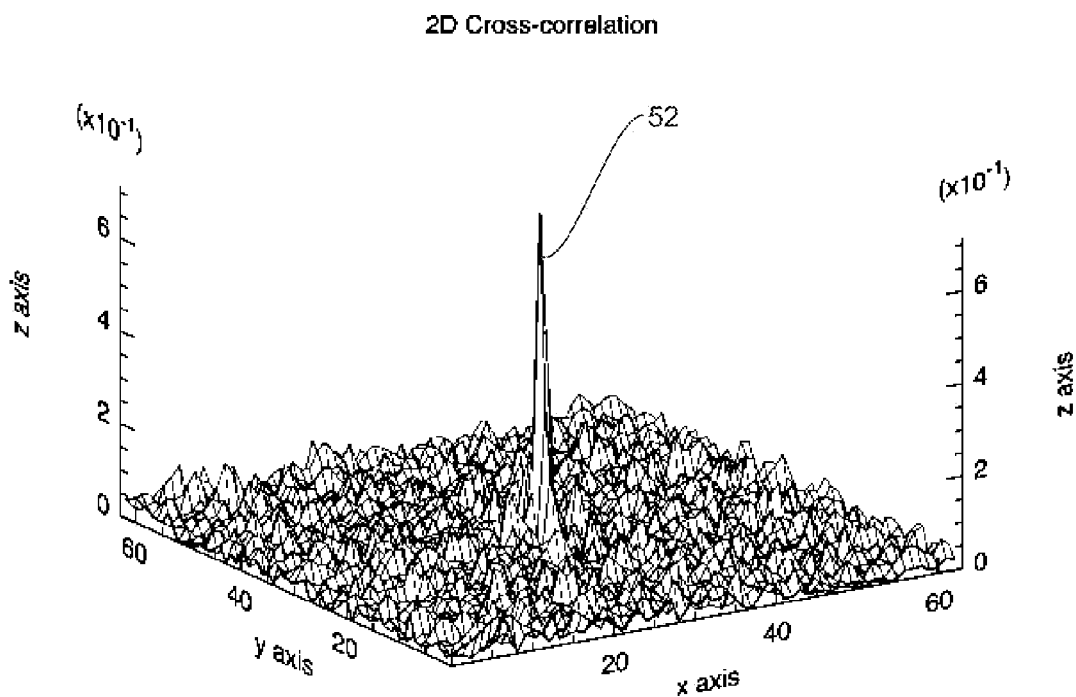
Figure 6A:
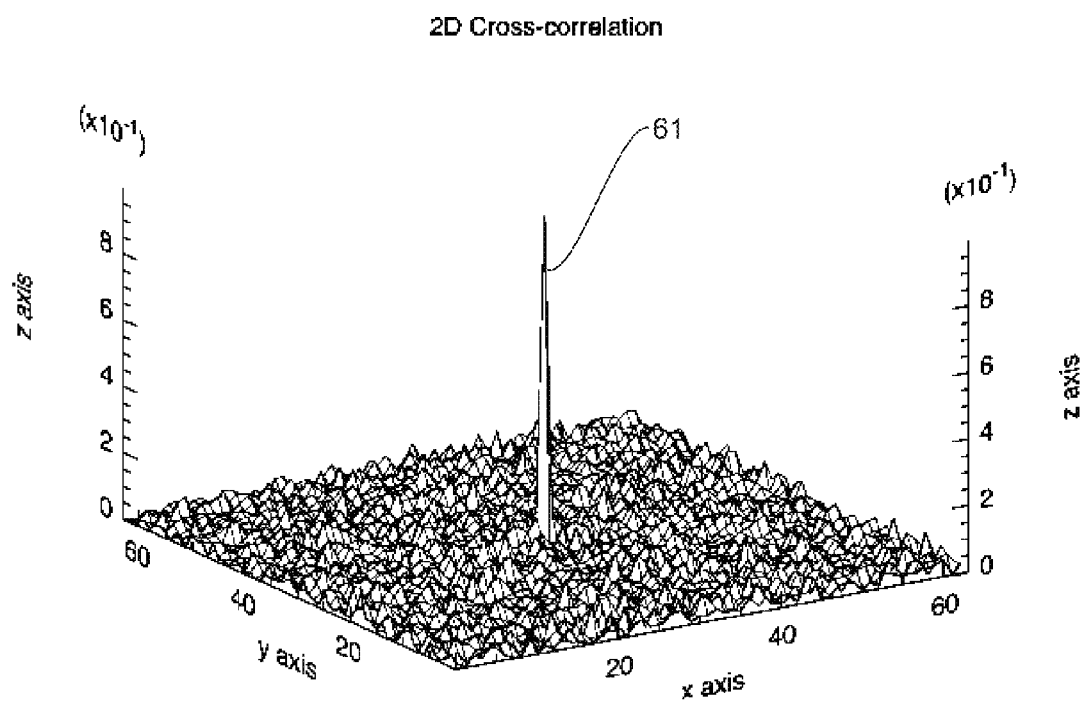
Figure 6B:
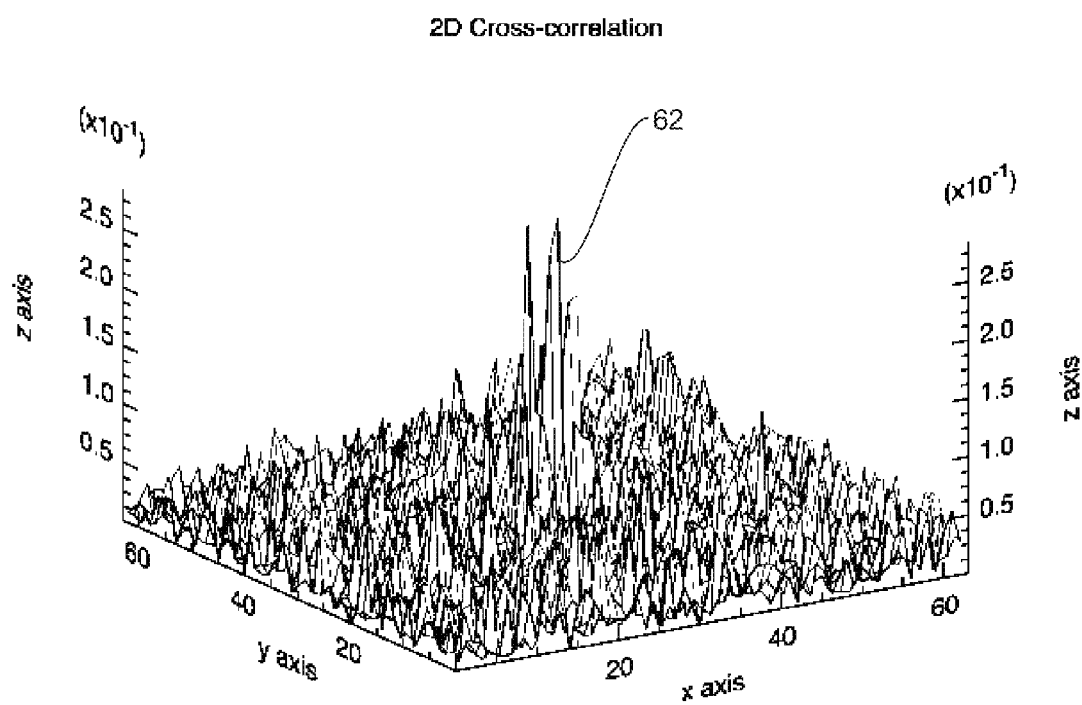

FIGS. 4A, 4B and 4C present three examples of correlation maps corresponding to three different scenarios for a same image (of a signature) to be analyzed: searching for the right watermark at the right position (FIG. 4A), searching for the wrong watermark at the right position (FIG. 4B) and searching for the right watermark at the wrong position (FIG. 4C);

FIGS. 5A and 5B present two examples of correlation maps corresponding to two different scenarios in starting from a same original first image (of a signature): an image to be analyzed that has been watermarked and not attacked (FIG. 5A) and an image to be analyzed that has been watermarked and attacked by a <<print & scan>> attack (FIG. 5B);

FIGS. 6A and 6B present two examples of correlation maps corresponding to two different scenarios in starting from a same original second image (of a signature): an image to be analyzed that has been watermarked and not attacked (FIG. 6A) and an image to be analyzed that has been watermarked and attacked by a <<print & scan>> attack as well as by 180° rotation (FIG. 6B).

Figure 9:
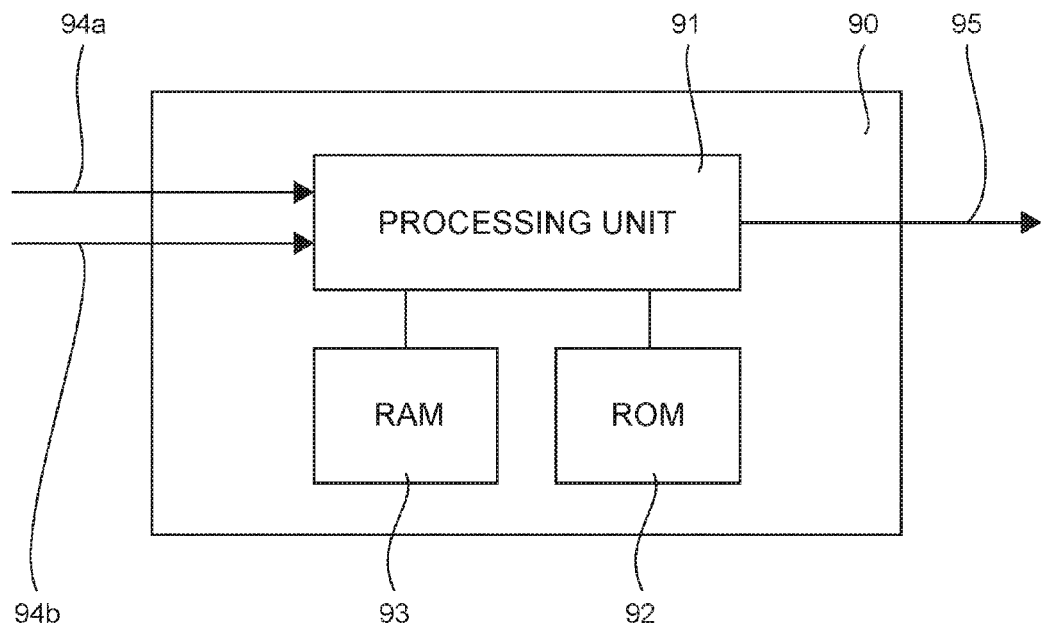
Figure 10:
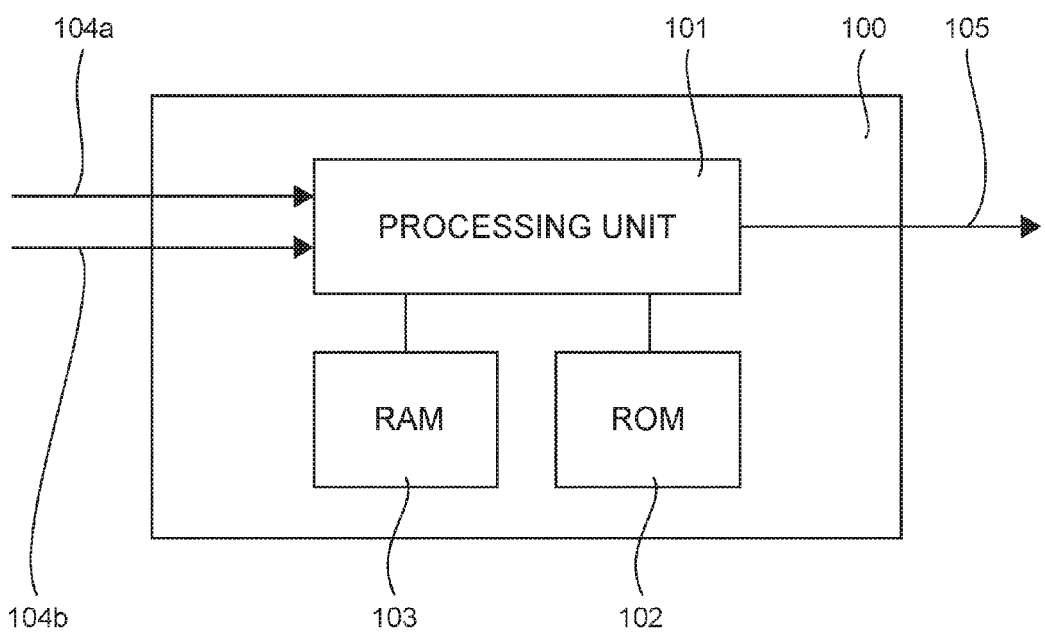
Figure 11:
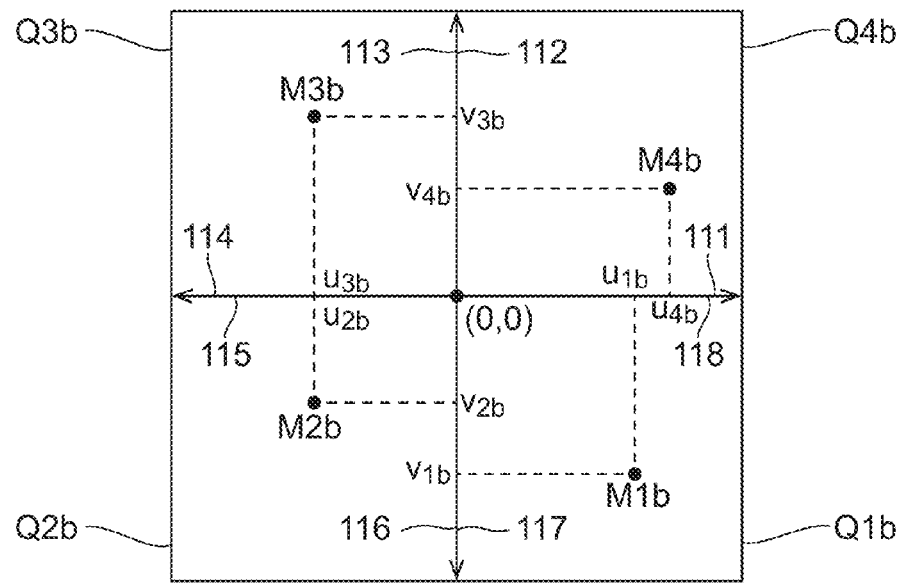
Figure 12:
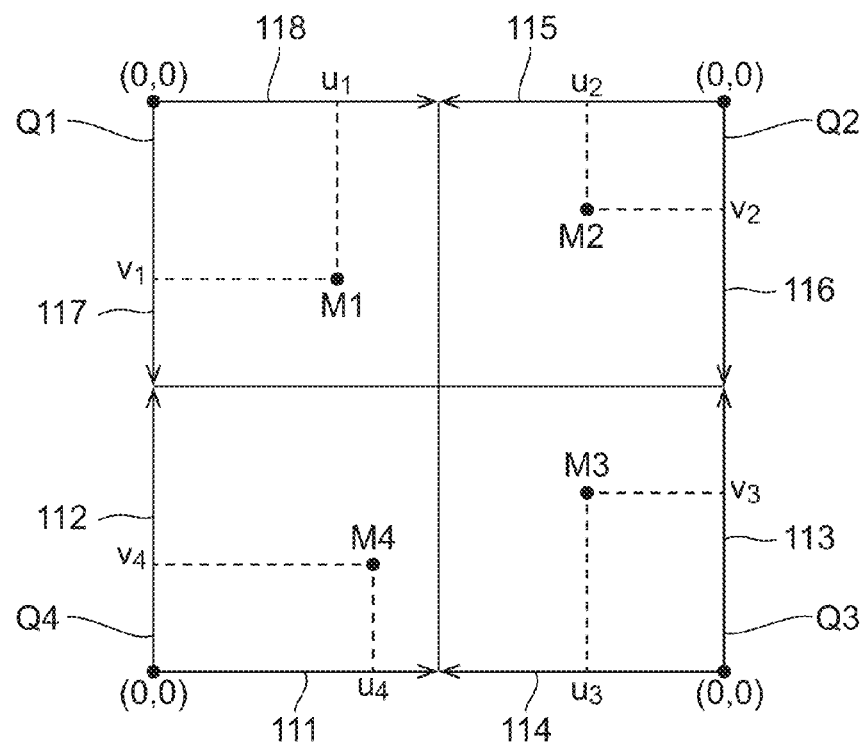

FIG. 7A is a 2D representation of the contrast sensitivity function (CSF, see detailed explanation here below) and FIG. 7B is a horizontal 1D section showing the CSF;

FIG. 8 is a view showing, in the left-hand part, a 2D representation of a contrast sensitivity function (CSF), in the central part, the ring-shaped watermark proposed in the above-mentioned technique by Solachidis and Pitas, and in the right-hand part, an example of a watermark according to the invention;

FIG. 9 presents the structure of a device for inserting according to one particular embodiment of the invention;

FIG. 10 presents the structure of a device for detecting according to one particular embodiment of the invention;

FIG. 11 illustrates the two axes of coordinates of each quadrant, in the case of a Fourier domain, the four quadrants of which have been exchanged so that the continuous component (0,0) is at the center;

FIG. 12 illustrates the two axes of coordinates of each quadrant, in the case of a Fourier domain, the four quadrants of which have not been exchanged so that the continuous component (0,0) is at the center.

6. DETAILED DESCRIPTION

Figure 1:
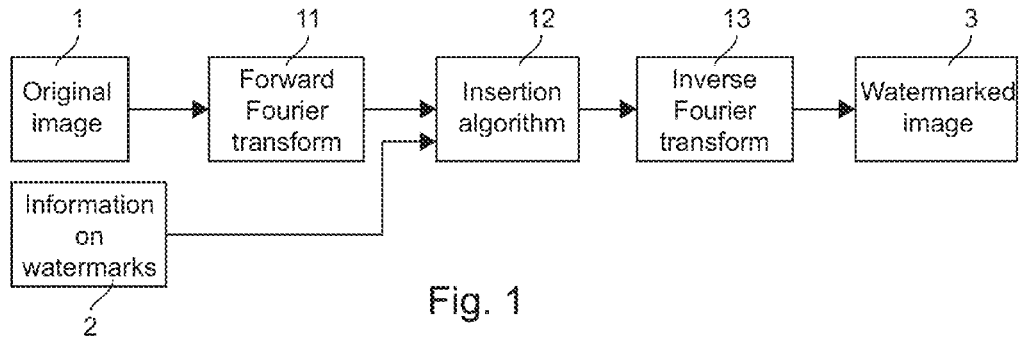
FIG. 1 is a flowchart of one particular embodiment of the method for inserting according to the invention.

Referring to FIG. 1, we now present a particular embodiment of the method for inserting according to the invention. This method for inserting is implemented by a device for inserting (see here below the description of FIG. 9).

It is assumed that the method for inserting receives, at input, an original image 1 (color or gray-scale image) and pieces of information 2 on the watermark to be inserted.

If the original image 1 is chromatic in the RGB format, a conversion into the YcrCb format is done, and then all the watermarking processing operations are performed on the luminance of the original image (<<Y>> component), the other chromatic components (<<Cr>> and <<Cb>>) being unchanged. If the original image is achromatic (luminance component only), all the watermarking operations are done directly on the luminance.

The pieces of information 2 on the watermark to be inserted specify especially:
  the position and the shape of the watermark in the Fourier domain;
  a key for creating the watermark, making it possible to determine the watermarking coefficients included in the watermark; and
  the strength of insertion α of the watermark (optionally, if the insertion is done with the insertion equation of one of the methods CMF and PMF discussed here below).

The watermark to be inserted comprises a set of watermarking coefficients (denoted as $w_{u,v}$) each associated with a distinct, determined position (u, v) of a given quadrant of a Fourier domain, the four quadrants of which are exchanged so that the continuous component is at the center.

The set of positions associated with these watermarking coefficients defines a determined convex pattern in the given quadrant of the Fourier domain (upper right quadrant in the example of FIG. 2 described here below). This convex pattern, which defines the shape of the watermark, is preferably a square or a rectangle. In the case of a square, it is preferably a square with $2^n \times 2^n$ positions, n being an integer greater than two and preferably such that: $3 \leq n \leq 6$ (i. e. a square 8×8, 16×16, 32×32 or 64×64).

The position of the watermark in the given quadrant of the Fourier domain is such that the spectral coordinates u and v of each watermarking coefficient (denoted as $w_{u,v}$), expressed in percentage of the dimensions U and V of the given quadrant of the Fourier domain, verify the relationships: $u > 66\% \times U$ and $v > 66\% \times V$.

It will be noted that the watermark is positioned in the high frequencies and not in the medium frequencies as in the above-mentioned technique by Solachidis and Pitas. The advantages related to this choice are discussed in detail here below, with reference to FIGS. 7A, 7B and 8.

In addition, preferably, the convex pattern is centered on a diagonal of the given quadrant of the Fourier domain, oriented by 45° relative to two reference axes serving to define the spectral coordinates u and v of a position (u, v) in the given quadrant of the Fourier domain.

The position of the watermark in the given quadrant of the Fourier domain is for example defined by the position of the center of the convex pattern (center of the square for example) or by the position of a particular point of the pattern (lower left-hand corner for example). The center of the convex pattern is also erroneously called the <<carrier frequency>> of the convex pattern (it is actually a pair of frequencies defining a point of the 2D Fourier domain).

In the case of an insertion according to the classic multiplicative form (CMF) or the pure multiplicative form (PMF) (described in detail here below) the watermark creation key is for example a numerical sequence of 15 digits each encoded on one byte (this sequence is based on the format of the French social security number, including the key). To determine the watermarking coefficients from this key, the following procedure is followed for example. The numerical sequence is converted into 15×8 bits, with a binary representation ±1 (each bit taking the value +1 or −1), then extended to the dimensions of the pattern defining the shape of the watermark. For a square pattern of 32×32 points, the extension algorithm is for example the following: (multiplication of the current value i by several already determined values):

for (i=15*8;i<32*32;i++)

Image[i]=Image[i−119]*Image[i−101]*Image[i−96]
    *Image[i−63]*Image[i−29];

In one variant, the extension algorithm is based on the <<Tausworthe>> algorithm.

The steps of the method for inserting of FIG. 1 are now described in detail.

The transform domain chosen here is the Fourier domain. The Fourier transform is defined as follows:

$$F(u,v) = \sum_{x=0}^{M} \sum_{y=0}^{N} f(x,y) \cdot e^{-j2\pi(u \cdot x/M + v \cdot y/N)}$$

and its inverse:

$$f(x,y) = \sum_{u=0}^{M} \sum_{v=0}^{N} F(u,v) \cdot e^{j2\pi(u \cdot x/M + v \cdot y/N)}$$

with F(u, v) the Fourier coefficient at the frequency position (u, v) and f (x, y) the value of the input image defined at the spatial position (i.e. at the pixel) (x, y).

At a step 11, a Fourier transform is applied to the original image 1. This makes it possible to obtain a 2D Fourier spectrum, defined by Fourier coefficients at different positions of the above-mentioned Fourier domain (the four quadrants of which are exchanged so that the continuous component is at the center).

At a step 12, the watermark is inserted in the Fourier spectrum resulting from the step 11. This is done by modifying the Fourier coefficients of this Fourier spectrum, as a function of the watermarking coefficients included in the watermark. The result of the step 12 is a modified Fourier spectrum.

At a step 13, an inverse Fourier transform is applied to the modified Fourier spectrum. This gives a watermarked image 3.

At the step 12, the watermark is inserted in complying with the central symmetry of the Fourier spectrum: for each Fourier coefficient (denoted as $x_{u,v}$) that is situated in the given quadrant of the Fourier domain at a position (u, v) and undergoes a modification as a function of a given watermarking coefficient (denoted as $w_{u,v}$), the Fourier coefficient that is situated at the symmetrical position in the quadrant symmetrical to the given quadrant relative to the center of the Fourier domain, also undergoes a modification as a function of this given watermarking coefficient. The symmetrical position is denoted as (−u, −v) if we use the axes of coordinates of the given quadrant, or (u, v) if we use the axes of coordinates of the symmetrical quadrant (cf description here below of FIGS. 11 and 12 for greater detail on the notion of axes of coordinates associated with each quadrant).

In addition, the watermark is inserted in modifying only the real part of each Fourier coefficient (denoted as $x_{u,v}$) undergoing a modification as a function of one of the watermarking coefficients (denoted as $w_{u,v}$). In other words, a Fourier coefficient of a Fourier spectrum is usually complex, having the form $z=a+i \cdot b$, and the modification of this Fourier coefficient during the insertion (for example according to one of the methods FMC, FMP or FSS presented here below) is done solely on its real part (a), the imaginary part (b) remaining unchanged.

The insertion is for example according to one of the following three methods:

Classic Multiplicative Form (CMF);
Pure Multiplicative Form (PMF); and
Simple Substitution Form (SSF).

In the Classic Multiplicative Form (CMF), the insertion equation is the following:

$$y_{u,v} = x_{u,v} + \alpha \times x_{u,v} \times w_{u,v} \quad (1)$$

where:

$y_{u,v}$ is a modified Fourier coefficient (watermarked coefficient) at the position (u, v) in the given quadrant of the Fourier domain;

$x_{u,v}$ is an original Fourier coefficient at the position (u, v) in the given quadrant of the Fourier domain;

$\alpha$ is a coefficient of weighting of watermarking strength;

$w_{u,v}$ is a watermarking coefficient taking the value +1 or −1.

The Pure Multiplicative Form (PMF) is a simplified watermarking technique. It is a simple multiplication of the Fourier coefficients of the transform of the original image by the watermark coefficients. The insertion equation is the following:

$$y_{u,v} = \alpha \times x_{u,v} \times w_{u,v} \quad (2)$$

where $\alpha$, $y_{u,v}$, $x_{u,v}$ and $w_{u,v}$ have already been defined here above.

In the Simple Substitution Form (SSF), a portion of the Fourier spectrum is quite simply replaced by a noise representing the watermark. The insertion equation is the following:

$$y_{u,v} = w_{u,v} \quad (3)$$

where $y_{u,v}$ has already been defined here above.

and $w_{u,v}$ is a watermark coefficient contained in a predetermined range, the maximum and minimum values of which, (typically in an interval: [~−8000, ~+8000]) are a function of the values of the real parts of the Fourier coefficients, each undergoing a modification as a function of one of the watermarking coefficients. Here the watermarking coefficients are no longer bipolar (i.e. taking the value +1 or −1) but comply with a Gaussian distribution in the above-mentioned range.

The Simple Substitution Form (SSF) improves security and makes it possible to propose blind watermarking.

For the first two forms of insertion (CMF and PMF), the watermark can be visible in the Fourier spectrum. This generally does not cause any problem so long as no hacking of the image is envisaged. The SSF type insertion makes the watermark less detectable in the Fourier domain. If the question of security comes into play, we must envisage the scenario in which a hacker will try to eliminate the watermark. It is clearly desirable that the watermarked image should be of (very) good quality but it is also necessary that the transformed domain should show no traces of the insertion of the watermark, or else the hacker could easily locate the watermark and therefore be potentially capable of eliminating it.

A watermark is said to be <<blind>> when the detector needs only the watermarked image and the original watermark (the term <<blind detection>> is also used). When the detector also needs the original image, the term used then is <<non-blind>> watermarking. When a part of the original image (or Fourier coefficients of a part of this image before insertion of the watermark) is necessary, the watermarking is said to be <<semi-blind>>. For the CMF and PMF methods of insertion, the detector needs the watermarked image, the original watermark and the original portion of the spectrum where the watermark has been inserted. This is therefore a semi-blind watermarking. This can entail constraints in certain cases (the need to store a large quantity of information for all the watermarked images). In the SSF method, we need only to preserve the original watermark, to apply it to the watermarked image. The method is therefore of the <<blind>> watermarking type.

Figure 2:
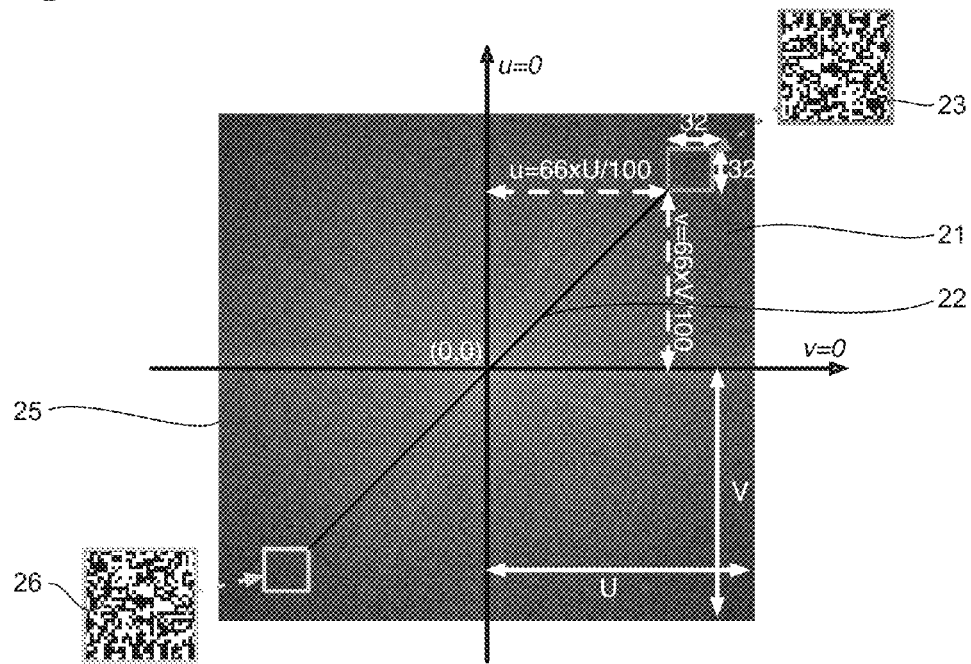
FIG. 2 illustrates an example of insertion of a watermark in the Fourier domain.

FIG. 2 illustrates an example of insertion of a watermark in the Fourier domain, and more specifically in the spectrum resulting from a Fourier transform applied to the original image.

In this example, the watermark is inserted in a given quadrant which is the upper right-hand quadrant 21 of the Fourier domain (this given quadrant having dimensions U and V). It is square-shaped, sized 32×32, and centered on the diagonal 22 of the given quadrant of the Fourier domain. A zoom on this noise square (if it is assumed that the insertion is done according to the Simple Substitution Form (SSF)) is referenced 23. The lower left-hand corner of this square possesses spectral coordinates u and v such that: u=66%×U and v=66%×V. Each of the other points of this square therefore also possesses spectral coordinates u and v such that: u>66%×U and v>66%×V.

Besides, in the example of FIG. 2, the watermark is inserted in complying with the central symmetry of the Fourier spectrum in order to be able to rebuild a real image during the inverse Fourier transformation. Any point in the given quadrant 21 of the Fourier domain, having coordinates (u, v) such that: $z_{u,v}=a+i\cdot b$, must automatically be represented in the form $z_{-u,-v}=a-i\cdot b$ at the point (−u, −v) of the symmetrical quadrant 25. In the example of FIG. 2, each modified Fourier coefficient (watermarked coefficient included in the square referenced 23) $z_{u,v}=a_w+i\cdot b$ at the position (u, v) in the given quadrant 21 of the Fourier domain, has a corresponding modified Fourier coefficient (watermarked coefficient included in the square referenced 26) $z_{-u,-v}=a_w-i\cdot b$ at the position (−u, −v) in the symmetrical quadrant 25 of the Fourier domain. All the other Fourier coefficients (outside the squares referenced 23 and 26) remain unchanged during the insertion.

Figure 3:
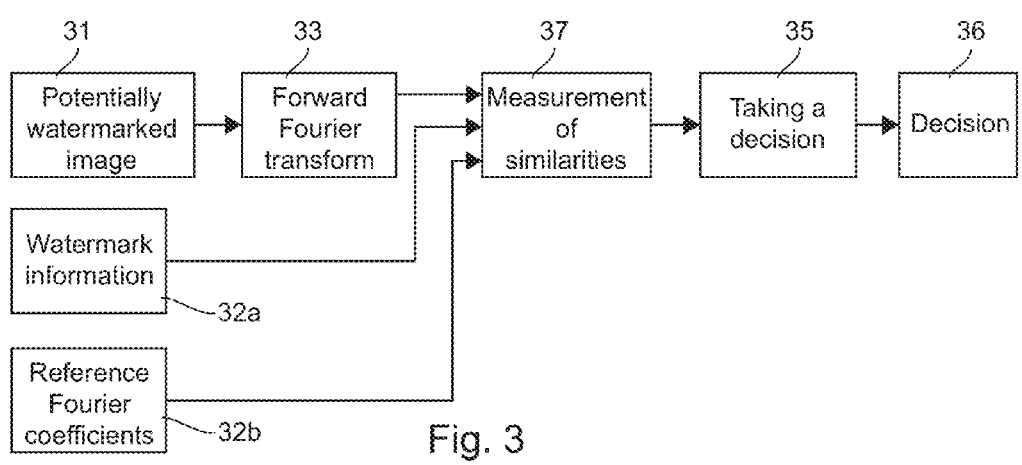
FIG. 3 is a flowchart of one particular embodiment of the method for detecting according to the invention.

Referring now to FIG. 3, we present one particular embodiment of the method for detecting according to the invention. This method for detecting is implemented by a device for detecting (see here below the description of FIG. 10).

It is assumed that the method for detecting receives inputs which are an image to be analyzed (a potentially watermarked image) 31 (color or gray-scale image) and pieces of information 32a on a reference watermark (i.e. a watermark that is supposed to be inserted into the image to be analyzed).

If the insertion is done with the insertion equation of the SSF method discussed here above, then the pieces of information 32a on the reference watermark specify especially:
  the position and the shape of the watermark in the Fourier domain; and
  a key for creating the watermark, used to determine the watermarking coefficients included in the watermark.

The different characteristics (especially the position and the shape) of the watermark have already been discussed here above for the method for inserting. They are therefore not described again.

If the insertion was done with the insertion equation of one of the CMF and PMF methods discussed here above:
  the pieces of information 32a on the watermark also specify the strength of insertion α of the watermark, and
  the method for detecting also receives inputs which are the reference Fourier coefficients 32b, which occupy the same positions in the 2D Fourier spectrum of the original image (i.e. the spectrum resulting from the Fourier transform of the original image) as the positions occupied in the Fourier domain by the coefficients of the reference watermark.

The steps of the method of detection of FIG. 3 are now described in detail.

At a step 33, a Fourier transform is applied to the image to be analyzed 31. This gives a 2D Fourier spectrum defined by Fourier coefficients at different positions of the Fourier domain (the four quadrants of which are exchanged so that the continuous component is at the center).

At a step 34, a measurement is made of similarities between two portions of the Fourier spectrum: a reference portion and a portion to be analyzed, extracted from the Fourier spectrum of the image to be analyzed.

The reference portion is determined as a function of the watermarking coefficients of the reference watermark:
  if the insertion has been done with the insertion equation of one of the above mentioned methods, FMC and FMP, the reference portion is determined by taking, for a given position (u, v) in the given quadrant of the Fourier domain, the result of a weighting of the watermarking coefficient ($w_{u,v}$) associated with this given position, by the reference Fourier coefficient ($x_{u,v}$) also situated at this given position: $w_{u,v} \times x_{u,v}$;
  if the insertion has been done with the insertion equation of the above-mentioned SSF method, the reference portion is determined by taking directly, for a given position (u, v) in the given quadrant of the Fourier domain, the watermarking coefficient ($w_{u,v}$) associated with this given position in the reference watermark (no weighting).

The portion to be analyzed is determined by obtaining the Fourier coefficients (of the 2D Fourier spectrum of the image to be analyzed) situated, in the given quadrant of the Fourier domain, at the positions associated with the watermarking coefficients of the reference watermark. The portion to be analyzed is the portion of the Fourier spectrum (of the image to be analyzed) which, it is guessed, contains the watermark. $y^*_{u,v}$ denotes the Fourier coefficient of the portion to be analyzed that occupies the position (u, v).

The measurement of similarities between the reference portion and the portion to be analyzed amounts to computing a 2D normalized cross-correlation between the reference portion and the portion to be analyzed, giving a 2D correlation map (here below called a 2D map).

This cross-correlation computation is preferably done according to the following equation:

$$f \star g = \mathcal{F}\ (F(v)G(v))$$

where:

f is the reference portion;

g is the portion to be analyzed;

$\mathcal{F}$ represents the inverse Fourier transform;

F(v) is the complex conjugate of the Fourier transform of f; and

G(v) is the Fourier transform of g.

A major difference with the correlation method used by Solachidis & Pitas is that the cross-correlation used in the invention sends back a 2D map (c(u,v)) and not a scalar map. Obtaining this 2D map makes it possible not only to evaluate a possible shift of the correlation peak due to a geometrical distortion but also to be able to re-synchronize the image according to this shift.

For example, if the correlation peak is shifted by a few coefficients rightwards from the center of the correlation map, it is enough to recompute the correlation by adjusting the frequency (u,v) towards the left.

In addition, when the image has undergone geometrical distortions, it often happens that three or four correlation peaks appear in the 2D correlation map. These peaks are positioned at the corners of a square rectangle which grows as and when the distortion becomes severe.

At a step 35, a decision is taken on the presence or absence of a watermark in the portion to be analyzed, as a function of the result of the step 34 for measuring similarities. The decision taken, referenced 36, is a decision on presence if at least one value of the 2D correlation map is above a predetermined threshold. In other words, the detection of the watermark in the image to be analyzed is fruitful when a peak appears in the correlation map.

Normally, if it not the right reference watermark that is given at input to the detector, the correlation is low and the detector takes a decision on absence of the watermark. This is the case, for example, if the detector searches for a watermark generated with the key <<132456789101112>> while the image to be analyzed had actually been watermarked with the key <<123456789101112>>.

In the same way, if it is not the right position of the reference watermark that is input to the detector, then the correlation is low and the detector decides that the watermark is absent. This is the case, for example, if the detector searches for a watermark centered on a position (u', v'), whereas the image to be analyzed is in reality watermarked with a watermark centered on a position (u, v).

FIGS. 4A, 4B and 4C present three examples of correlation maps corresponding to three different scenarios for a same image to be analyzed (a signature image): searching for the right watermark at the right position (FIG. 4A), searching for the wrong watermark at the right position (FIG. 4B) and searching for the right watermark at the wrong position (FIG. 4C).

It can be seen that, in the correlation map of FIG. 4A, there is a peak 41 with an amplitude equal to about 0.94638. This value is above a predetermined threshold S1 which, in this example, is equal to 0.2. From this, the detector therefore accurately deduces the presence of a watermark.

By contrast, in the correlation maps of FIGS. 4B and 4C, there is no peak above the above-mentioned threshold S1. There is only a noise below 0.11047 in FIG. 4B and 0.10340 in FIG. 4C. From this, the detector therefore accurately deduces the absence of a watermark.

FIGS. 5A and 5B present two examples of correlation maps corresponding to two different scenarios starting from a same first original image (of a signature): an image to be analyzed that is watermarked and not attacked (FIG. 5A) and an image to be analyzed that is watermarked and attacked by a <<print and scan>> attack (FIG. 5B).

It can be seen in the correlation map of FIG. 5A, as in the correlation map of FIG. 4A (same original image), that there is a peak 51 of amplitude equal to about 0.99946. This value is above the above-mentioned threshold S1. From this, the detector therefore accurately deduces the presence of a watermark.

It can be seen in the correlation map of FIG. 5B, that there is also a peak 52 of amplitude equal to about 0,71457. This value is slightly lower than the value of the peak 51 of FIG. 5A, but nevertheless above the above-mentioned threshold S1. From this, the detector therefore accurately deduces (despite the print and scan attack), that there is a presence of a watermark.

FIGS. 6A and 6B present two examples of correlation maps corresponding to two different scenarios and starting from a same second original image (of a signature): an image to be analyzed that is watermarked and not attacked (FIG. 6A) and an image to be analyzed that is watermarked and attacked by a <<print and scan>> attack as well as by 180° rotation (the printed-out sheet has been placed reverse-side down on the scanner) (FIG. 6B).

It can be seen, in the correlation map of FIG. 6A, that there is a peak 61 of amplitude equal to about 0.99768. This value is above a second predetermined threshold S2 which, in this example, is equal to S1 (i.e. to 0.2). From this, the detector therefore accurately deduces the presence of a watermark.

It can be seen in the correlation map of FIG. 6B, that there is also a peak 62 of amplitude equal to about 0.28465. This value is lower than the value of the peak 61 of FIG. 6A, but nevertheless above the above-mentioned threshold S2. From this, the detector therefore accurately deduces (despite the <<print and scan>> attack and the rotation), that there is a presence of a watermark.

Referring now to FIGS. 7A, 7B and 8, we discuss the advantages related to the choice of the positioning in the high frequencies, and not in the medium frequencies as in the above-mentioned technique by Solachidis and Pitas.

In the invention, the watermark is deliberately inserted in very high frequencies. The main motive for this is to ensure the invisibility of the watermark, especially but not exclusively when the images considered are text images (for example images of signatures). It must be noted that text images (signatures, invoices, payslips etc.) are particularly hard to modify without giving rise to visible artifacts since these are binary images having a very small range of colors, very high contrasts and above all substantial uniform zones.

The contrast sensitivity function (CSF) is used to determined the sensitivity of an individual's visual system according to the frequency of the stimuli that he or she perceives. It has to be applied to the Fourier spectrum.

In FIG. 7A, which is a 2D representation of this CSF, the more luminous a pixel, the more sensitive will the human visual system (HVS) be to this range of frequencies. The darker a pixel, the less sensitive will the human visual system be to the distortions in this range of frequencies. FIG. 7A represents the CSF in 2D, as it would be applied to a 2D Fourier spectrum of an image. It is assumed here that the center of the Fourier spectrum (center of FIG. 7A) represents the low frequencies, and the greater the distance from the center, the greater is the shift towards the high frequencies.

FIG. 7B is a horizontal 1D section view of the CSF (cut in its middle), and shows that, towards the low frequencies (x=0) the SVH is of low sensitivity. Then, when the frequency rises (up to about x=40), the SVH is increasingly sensitive to the modifications of frequencies. Then, finally, when x>40, human sensitivity decreases. It is important to note that, despite a very low CSF at the frequencies close to zero, watermarking at such frequencies is almost impossible because the strength of the watermark would have to be very low to ensure the invisibility of the watermark. Robustness would therefore not be assured.

FIG. 8, in its left-hand part, presents a 2D representation of the contrast sensitivity function (CSF) (as in FIG. 7A). In its central part the figure presents the ring-shaped watermark (referenced 83) proposed in the above-mentioned technique by Solachidis and Pitas, and in its right-hand part it presents an example of a watermark according to the invention inserted into the Fourier spectrum of an image. In this example, the watermark according to the invention is square-shaped (see the square referenced 81 in the given quadrant of the Fourier domain, and its counterpart referenced 82 in the symmetrical quadrant) and its lower left-hand corner is at the position (u=66% U, v=66% V).

It can be seen that the watermark 83 of Solachidis and Pitas is positioned at frequencies for which the HVS is very sensitive, while the watermark 81, 82 according to one example of the invention is positioned in a range of frequencies for which the human HVS has difficulty in discriminating the frequencies.

It can also be seen that the watermark 81, 82, according to one example of the invention, in being positioned on the diagonal of the spectrum (orientation at 45°), is positioned in a range of frequencies for which the human HVS is less sensitive.

FIG. 9 presents the simplified structure of an insertion device 90 implementing the method of insertion according to the invention (for example the particular embodiment described here above with reference to FIG. 1). This insertion device comprises a RAM 93, a processing unit 91, equipped for example with a processor and driven by a computer program stored in a ROM 92. At initialization, the computer program code instructions are, for example, loaded into the RAM 93 and then executed by the processor of the processing unit 91. The processing unit 91 inputs an original image 94a and information elements 94b on the watermark to be inserted. The processor of the processing unit 91 generates a watermarked image 95 at output, according to the instructions of the program 92.

FIG. 10 presents the simplified structure of a device for detecting 90 implementing the method for detecting according to the invention (for example the particular embodiment described here above with reference to FIG. 3). This device for detecting comprises a RAM 103, a processing unit 101, equipped for example with a processor and driven by a computer program stored in a ROM 102. At initialization, the computer program code instructions are, for example, loaded into the RAM 103 and then executed by the processor of the processing unit 101. The processing unit 101 receives inputs which are an image to be analyzed 104a and pieces of information 104b on the reference watermark. In one variant (if the insertion has been done with the insertion equation of one of the methods CMF and PMF discussed here above), the processing unit 101 also receives inputs which are reference Fourier coefficients (see definitions and explanations further above). The processor of the processing unit 101 generates a decision 105 (indicating whether a watermark is present or not in the image to be analyzed), according to the instructions of the program 102.

FIG. 9 (and FIG. 10 respectively) illustrate only one particular way, among several possible ways, of carrying out the algorithm of FIG. 1 (and FIG. 3 respectively). Indeed, the technique of insertion (and of detection respectively) can be done equally well:

- on a reprogrammable computing machine (a PC, a DSP or a micro-controller) executing a program comprising a sequence of instructions, or
- on a dedicated computation machine (for example a set of logic gates such as FPGA or an ASIC, or any other hardware module).

Should the technique of insertion (and detection respectively) of the invention be implanted on a reprogrammable computing machine, the corresponding program (i.e. the sequence of instructions) could be stored in a storage medium that is detachable (for example a floppy disk, a CD-ROM or a DVD-ROM) or non-detachable, this storage medium being partially or totally readable by a computer or a processor.

In the example described here above with reference to FIGS. 1 to 3:

- the four quadrants of the Fourier domain are exchanged so that the continuous component is at the center;
- the watermark is registered in the upper right quadrant. In addition, to comply with the central symmetry of the Fourier spectrum (i.e. the hermitian property of the spectrum of the image) the lower left-hand quadrant is also modified. More specifically, in this example, the upper right-hand quadrant has two axes of coordinates (two half lines) extending from the continuous component (0,0). Besides, the spectral coordinates u and v of a position (u, v) in the upper right-hand quadrant are measured along two axes of coordinates of this upper right-hand quadrant, and starting from the continuous component (0,0).

As indicated further above, the general principle of the invention consists in choosing in a particular way, in the Fourier domain, the position of the watermark (it is inserted in the high frequencies) and the shape of the watermark (convex pattern). This particular combination of position and shape ensures the invisibility (or low visibility) of the watermark while at the same time offering high robustness, especially with regard to a <<print & scan>> attack.

This general principle and, therefore, the present invention can also be applied to the case where:

- the four quadrants of the Fourier domain are exchanged so that the continuous component is at the center, and
- the watermark is inserted in any one of the four quadrants (and to comply with the central symmetry of the Fourier spectrum, in the quadrant that is symmetrical relative to the continuous component (0,0)).

Whatever the given quadrant in which the watermark is inserted, the condition on the position of the watermark is always the same: the watermark comprises a set of watermarking coefficients ($w_{u,v}$) each associated with a distinct determined position (u, v) of the given quadrant, of which the spectral coordinates u and v, measured along the two axes of coordinates of the given quadrant and starting from the continuous component, and expressed in percentage of the dimensions U and V of the given quadrant, are such that: u>66%×U and v>66%×V.

It will be noted that the values of u and v thus defined are always positive since they correspond to the distance between the continuous component (0,0) and a projection of a point on one of the axes of coordinates.

Thus, as illustrated in FIG. 11:
in the upper right-hand quadrant Q4b, the spectral coordinates $u_{4b}$ and $v_{4b}$ of a point M4b are positive values measured along the two axes of coordinates (half lines) 111 and 112 respectively, extending from the continuous component (0,0);
in the upper left-hand quadrant Q3b, the spectral coordinates $u_{3b}$ and $v_{3b<}$ of a point M3b are positive values measured along the two axes of coordinates (half lines) 114 and 113 respectively, extending from the continuous component (0,0);
in the lower left-hand quadrant Q2b, the spectral coordinates $u_{2b}$ and $v_{2b}$ of a point M2b are positive values measured along the two axes of coordinates (half lines) 115 and 116 respectively, extending from the continuous component (0,0);
in the lower right-hand quadrant Q1b, the spectral coordinates $u_{1b}$ and $v_{1b}$ of a point M1b are positive values measured along the two axes of coordinates (half lines) 118 and 117 respectively, extending from the continuous component (0,0).

It will be noted that, in FIG. 11, the axes of coordinates (half lines) 111 and 118 coincide. This is also the case for the axes 112 and 113, 114 and 115, and 116 and 117.

The general principle mentioned here above also applies to the case where:
the four quadrants of the Fourier domain are not exchanged so that the continuous component is at the center; and
the watermark is inserted in any one of the four quadrants (and to comply with the central symmetry of the Fourier spectrum, in the quadrant that is symmetrical relative to the continuous component (0,0).

Whatever the given quadrant in which the watermark is inserted, the condition on the position of the watermark is always the same: the watermark comprises a set of watermarking coefficients ($w_{u,v}$) each associated with a distinct determined position (u, v) of the given quadrant, of which the spectral coordinates u and v, measured along the two axes of coordinates of the given quadrant and starting from the continuous component, and expressed in percentage of the dimensions U and V of the given quadrant, are such that: u>66%×U and v>66%×V.

Thus, as illustrated in FIG. 12:
in the lower left-hand quadrant Q4 (identical to the upper right-hand quadrant Q4b of FIG. 11), the spectral coordinates $u_4$ and $v_4$ of a point M4 are positive values measured along the two axes of coordinates (half lines) 111 and 112 respectively, extending from the continuous component (0,0);
in the lower right-hand quadrant Q3 (identical to the upper left-hand quadrant Q3b of FIG. 11), the spectral coordinates $u_3$ and $v_3$ of a point M3 are positive values measured along the two axes of coordinates (half lines) 114 and 113 respectively, extending from the continuous component (0,0);
in the upper right-hand quadrant Q2 (identical to the upper left-hand quadrant Q2b of FIG. 11), the spectral coordinates $u_2$ and $v_2$ of a point M2 are positive values measured along the two axes of coordinates (half lines) 115 and 116 respectively, extending from the continuous component (0,0);
in the upper left-hand quadrant Q1 (identical to the upper left-hand quadrant Q1b of FIG. 11), the spectral coordinates $u_1$ and $v_1$ of a point M1 are positive values measured along the two axes of coordinates (half lines) 117 and 118 respectively, extending from the continuous component (0,0).

At least one embodiment of the present disclosure provides a technique for watermarking images (including text-type images) that is robust against "print and scan" attacks.

At least one embodiment provides a technique of this kind that is simpler to implement than the above-mentioned technique by Solachidis and Pitas.

At least one embodiment provides such a technique enabling a better quality of watermarked images than with the above-mentioned technique by Solachidis and Pitas.

At least one embodiment provides such a technique making it possible to guarantee the invisibility (or at least the low visibility) of the watermark, while at the same time offering high robustness.

At least one embodiment of the invention to provide such a technique improving detection as compared the above-mentioned technique by Solachidis and Pitas.

Although the present disclosure has been described with reference to one or more examples, workers skilled in the art will recognize that changes may be made in form and detail without departing from the scope of the disclosure and/or the appended claims.

The invention claimed is:

1. A method comprising:
inserting a digital watermark in an image by means of an insertion device, wherein inserting comprises:
applying a Fourier transform to said image, to obtain a two dimensional Fourier spectrum defined by Fourier coefficients at different positions of a Fourier domain comprising four quadrants, each possessing two axes of coordinates extending from the continuous component;
inserting said watermark in said Fourier spectrum by modification of Fourier coefficients of said Fourier spectrum, as a function of watermarking coefficients comprised in the watermark, to obtain a modified Fourier spectrum; and
applying an inverse Fourier transform to said modified Fourier spectrum to obtain a watermarked image;
wherein said watermark comprises a set of watermarking coefficients each associated with a distinct determined position of a given quadrant among said quadrants of the Fourier domain, the spectral coordinates u and v of which, measured along the two axes of coordinates of the given quadrant and starting from the continuous component and expressed in percentage of the dimensions U and V of the given quadrant, are such that: u>66%×U and v>66%×V,
and wherein the set of positions associated with said watermarking coefficients defines a convex pattern determined in the given quadrant.

2. The method according to claim 1, wherein said convex pattern is a square or a rectangle.

3. The method according to claim 2, wherein said convex pattern is a square with $2^n \times 2^n$ positions, n being an integer greater than two.

4. The method according to claim 3, wherein: $3 \leq n \leq 6$.

5. The method according to claim 1, wherein said watermark is inserted in complying with the central symmetry of the Fourier spectrum: for each Fourier coefficient that is situated in the given quadrant and undergoes a modification as a function of the given watermark, a Fourier coefficient that is situated in the quadrant symmetrical to the given quadrant, relative to the center of the Fourier domain, also undergoes a modification as a function of said given watermarking coefficient.

6. The method according to claim 1, wherein said convex pattern is centered on a diagonal of the given quadrant, oriented by 45° relative to the two axes of coordinates serving to define the spectral coordinates u and v of a position in the given quadrant.

7. The method according to claim 1, wherein the watermark is inserted according to the following insertion equation: $y_{u,v}=x_{u,v}+\alpha \times x_{u,v} \times w_{u,v}$, where:
   $y_{u,v}$ is a modified Fourier coefficient, at the position in the given quadrant of the Fourier domain;
   $x_{u,v}$ is an original Fourier coefficient at the position in the given quadrant of the Fourier domain;
   $\alpha$ is a weighting coefficient for the watermarking strength; and
   $w_{u,v}$ is a watermarking coefficient taking the value +1 or −1.

8. The method according to claim 1, wherein the watermark is inserted according to the following insertion equation: $y_{u,v}=\alpha \times x_{u,v} \times w_{u,v}$, where:
   $y_{u,v}$ is a modified Fourier coefficient at the position in the given quadrant of the Fourier domain;
   $x_{u,v}$ is an original Fourier coefficient at the position in the given quadrant of the Fourier domain;
   $\alpha$ is a weighting coefficient of the watermarking strength; and
   $w_{u,v}$ is a weighting coefficient taking the value +1 or −1.

9. The method according to claim 1, wherein the watermark is inserted according to the following insertion equation: $y_{u,v}=w_{u,v}$, where:
   $y_{u,v}$ is a modified Fourier coefficient at the position in the given quadrant of the Fourier domain;
   $w_{u,v}$ is a watermarking coefficient comprised in a predetermined range.

10. The method according to claim 9, wherein the minimum and maximum values of said predetermined range are a function of the values of the real parts of the Fourier coefficients each undergoing a modification as a function of said watermarking coefficients.

11. The method according to claim 1, wherein the watermark is inserted by modifying only the real part of each Fourier coefficient undergoing a modification as a function of said watermarking coefficients.

12. A method comprising:
   detecting a digital watermark in an image to be analyzed, by means of a detection device, wherein detecting comprises:
   applying a Fourier transform to the image to be analyzed to obtain a two dimensional Fourier spectrum, defined by the Fourier coefficients at different positions of a Fourier domain comprising four quadrants each possessing two axes of coordinates extending from the continuous component;
   measuring similarities between two Fourier spectrum portions: a reference portion and a portion to be analyzed, extracted from said Fourier spectrum of the image to be analyzed;
   taking a decision on presence or absence of a watermark in said portion to be analyzed as a function of the result of measuring similarities;
   wherein the detection device has at its disposal:
   a reference watermark comprising a set of watermarking coefficients each associated with a distinct determined position of one given quadrant among said quadrants of the Fourier domain, of which the spectral coordinates u and v, measured along both axes of coordinates of the given quadrant and starting from the continuous component, and expressed in percentage of the dimensions U and V of the given quadrant are such that: $u>66\% \times U$ and $v>66\% \times V$, and
   the set of the positions associated with the watermarking coefficients, which define a determined convex pattern in the given quadrant of the Fourier domain,
   and wherein measuring similarities comprises:
   determining said reference portion, as a function of the watermarking coefficients of said reference watermark;
   determining said portion to be analyzed, comprising obtaining the Fourier coefficients situated, in the given quadrant, at the positions associated with the watermarking coefficients of said reference watermark;
   computing a two dimensional normalized cross-correlation between the reference portion and the portion to be analyzed, giving a two dimensional correlation map;
   and wherein a decision on presence is taken if at least one value of the two dimensional correlation map is above a given threshold.

13. The method according to claim 12, wherein determining said reference portion comprises taking, for a given position in the given quadrant of the Fourier domain, the watermarking coefficient associated with said given position in said reference watermark.

14. The method according to claim 12, wherein determining said reference portion comprises taking, for a given position in the given quadrant of the Fourier domain, the result of a weighting:
   of the watermarking coefficient associated with said given position,
   by a reference Fourier coefficient situated, in the given quadrant of the Fourier domain, at said given position, said reference Fourier coefficient belonging to a two dimensional Fourier spectrum resulting from a Fourier transform of an original image, the detection device having available said reference Fourier coefficient.

15. The method according to claim 12, wherein computing a two dimensional normalized cross-correlation is done according to the following equation:

$$f \star g = \mathcal{F}(\overline{F(v)}G(v))$$

where:
   f is the reference portion;
   g is the portion to be analyzed;
   $\mathcal{F}$ represents the inverse Fourier transform;
   $\overline{F(v)}$ is the complex conjugate of the Fourier transform of f; and
   G(v) is the Fourier transform of g.

16. The method according to claim 12, wherein said convex pattern is a square or a rectangle.

17. The method according to claim 16, wherein said convex pattern is a square with $2^n \times 2^n$ positions, n being an integer greater than two.

18. The method according to claim 17, wherein: $3 \leq n \leq 6$.

19. The method according to claim 12, wherein said convex pattern is centered on a diagonal of the given quadrant of the Fourier domain, oriented by 45° relative to the axes of coordinates serving to define the spectral coordinates u and v of a position in the given quadrant of the Fourier domain.

20. A computer-readable non-transitory medium storing a computer program comprising a set of instructions executable by a computer to implement a method for inserting when said program is executed on a computer, wherein the method comprises:

inserting a digital watermark in an image by an insertion device, wherein inserting comprises:

applying a Fourier transform to said image, to obtain a two dimensional Fourier spectrum defined by Fourier coefficients at different positions of a Fourier domain comprising four quadrants, each possessing two axes of coordinates extending from the continuous component;

inserting said watermark in said Fourier spectrum by modification of Fourier coefficients of said Fourier spectrum, as a function of watermarking coefficients comprised in the watermark, to obtain a modified Fourier spectrum; and applying an inverse Fourier transform to said modified Fourier spectrum to obtain a watermarked image;

wherein said watermark comprises a set of watermarking coefficients each associated with a distinct determined position of a given quadrant among said quadrants of the Fourier domain, the spectral coordinates u and v of which, measured along the two axes of coordinates of the given quadrant and starting from the continuous component and expressed in percentage of the dimensions U and V of the given quadrant, are such that: $u>66\%\times U$ and $v>66\%\times V$, and wherein the set of positions associated with said watermarking coefficients defines a convex pattern determined in the given quadrant.

21. A computer-readable non-transitory medium storing a computer program comprising a set of instructions executable by a computer to implement a method for detecting when said program is executed on a computer, wherein the method comprises:

detecting a digital watermark in an image to be analyzed, by a detection device, the method comprising:

applying a Fourier transform to the image to be analyzed to obtain a two dimensional Fourier spectrum, defined by the Fourier coefficients at different positions of a Fourier domain comprising four quadrants each possessing two axes of coordinates extending from the continuous component;

measuring similarities between two Fourier spectrum portions: a reference portion and a portion to be analyzed, extracted from said Fourier spectrum of the image to be analyzed;

taking a decision on presence or absence of a watermark in said portion to be analyzed as a function of the result of measuring similarities;

wherein the detection device has at its disposal:

a reference watermark comprising a set of watermarking coefficients each associated with a distinct determined position of one given quadrant among said quadrants of the Fourier domain, of which the spectral coordinates u and v, measured along both axes of coordinates of the given quadrant and starting from the continuous component, and expressed in percentage of the dimensions U and V of the given quadrant are such that: $u>66\%\times U$ and $v>66\%\times V$, and the set of the positions associated with the watermarking coefficients, which define a determined convex pattern in the given quadrant of the Fourier domain, and wherein measuring similarities comprises:

determining said reference portion, as a function of the watermarking coefficients of said reference watermark;

determining said portion to be analyzed, comprising obtaining the Fourier coefficients situated, in the given quadrant, at the positions associated with the watermarking coefficients of said reference watermark;

computing a two dimensional normalized cross-correlation between the reference portion and the portion to be analyzed, giving a two dimensional correlation map;

and wherein a decision on presence is taken if at least one value of the two dimensional correlation map is above a given threshold.

22. A device for inserting a digital watermark in an image, the device comprising:

means for applying a Fourier transform to said image; to obtain a 2D Fourier spectrum, defined by Fourier coefficients at different positions of a Fourier domain comprising four quadrants each possessing two axes of coordinates extending from the continuous component;

means for inserting said watermark in said Fourier spectrum by modification of Fourier coefficients of said Fourier spectrum, as a function of watermarking coefficients comprised in the watermark, to obtain a modified Fourier spectrum;

means for applying an inverse Fourier transform to said modified Fourier spectrum making it possible to obtain a watermarked image;

wherein said watermark comprises a set of watermarking coefficients each associated with a distinct determined position of a given quadrant among said quadrants of the Fourier domain, the spectral coordinates u and v of which, measured along the two axes of coordinates of the given quadrant and starting from the continuous component and expressed in percentage of the dimensions U and V of the given quadrant, are such that: $u>66\%\times U$ and $v>66\%\times V$, and wherein the set of positions associated with said watermarking coefficients defines a determined convex pattern in the given quadrant.

23. A device for detecting a digital watermark in an image to be analyzed, the device comprising:

means for applying a Fourier transform to the image to be analyzed to obtain a two dimensional Fourier spectrum, defined by the Fourier coefficients at different positions of a Fourier domain comprising four quadrants each possessing two axes of coordinates extending from the continuous component;

means for measuring similarities between two Fourier spectrum portions: a reference portion and a portion to be analyzed, extracted from said Fourier spectrum of the image to be analyzed;

means for taking a decision on presence or absence of a watermark in said portion to be analyzed as a function of the result of measuring similarities;

wherein the device for detecting has at its disposal:

a reference watermark comprising a set of watermarking coefficients each associated with a distinct determined position of one given quadrant among said quadrants of the Fourier domain, of which the spectral coordinates u and v, measured along both axes of coordinates of the given quadrant and starting from the continuous component, and expressed in percentage of the dimensions U and V of the given quadrant are such that: $u>66\%\times U$ and $v>66\%\times V$; and the set of the positions associated with the watermarking coefficients, which define a determined convex pattern in the given quadrant of the Fourier domain, wherein the means for measuring similarities comprise:

means for determining said reference portion as a function of the watermarking coefficients of said reference watermark;

means for determining said portion to be analyzed, to obtain the Fourier coefficients situated, in the given quadrant, at the positions associated with the watermarking coefficients of said reference watermark;

means for computing a two dimensional normalized cross-correlation between the reference portion and the portion to be analyzed, giving a two dimensional correlation map;

and wherein the means for taking a decision are adapted to taking a decision on presence if at least one value of the two dimensional correlation map is above a given threshold.

* * * * *